United States Patent
Callahan et al.

(10) Patent No.: US 8,191,581 B2
(45) Date of Patent: Jun. 5, 2012

(54) WIRE TUBE STRUCTURE FOR EXHAUST COMPONENT

(75) Inventors: Joseph E. Callahan, Greenwood, IN (US); Kwin Abram, Columbus, IN (US)

(73) Assignee: Emcon Technologies, LLC, Wilmington, DE (US)

( * ) Notice: Subject to any disclaimer, the term of this patent is extended or adjusted under 35 U.S.C. 154(b) by 513 days.

(21) Appl. No.: 12/424,889

(22) Filed: Apr. 16, 2009

(65) Prior Publication Data

US 2010/0263762 A1    Oct. 21, 2010

(51) Int. Cl.
*F16L 9/14* (2006.01)

(52) U.S. Cl. ........ 138/149; 138/148; 138/138; 138/140; 181/252; 181/256

(58) Field of Classification Search .................. 138/149, 138/148, 137, 140, 138; 181/252, 256
See application file for complete search history.

(56) References Cited

U.S. PATENT DOCUMENTS

| | | | | |
|---|---|---|---|---|
| 1,878,424 A | * | 9/1932 | Oldberg | 181/250 |
| 1,975,861 A | * | 10/1934 | Oldberg | 181/250 |
| 2,014,666 A | * | 9/1935 | Peik | 181/252 |
| 2,834,425 A | * | 5/1958 | Rawson | 181/252 |
| 4,444,288 A | * | 4/1984 | Sekiya et al. | 181/258 |
| H0594 H | * | 3/1989 | Adorjan | 138/148 |
| 5,134,846 A | * | 8/1992 | White | 60/272 |
| 5,350,888 A | * | 9/1994 | Sager et al. | 181/247 |
| 5,705,777 A | * | 1/1998 | Flanigan et al. | 181/252 |
| 5,784,784 A | * | 7/1998 | Flanigan et al. | 29/890.08 |
| 5,992,560 A | * | 11/1999 | Matsuoka et al. | 181/252 |
| 5,996,643 A | * | 12/1999 | Stonitsch | 138/143 |
| 6,857,502 B2 | * | 2/2005 | Naito | 181/252 |

* cited by examiner

*Primary Examiner* — Patrick F Brinson
(74) *Attorney, Agent, or Firm* — Carlson Gaskey & Olds

(57) ABSTRACT

A vehicle exhaust component includes an outer shell defining an internal cavity and at least one internal pipe located within the internal cavity. A wire tube surrounds the internal pipe and is spaced apart from the pipe by a radial gap. This radial gap is filled with a fiber material.

20 Claims, 1 Drawing Sheet

WIRE TUBE STRUCTURE FOR EXHAUST COMPONENT

TECHNICAL FIELD

The subject invention relates to a wire tube structure used in a vehicle exhaust system, and more particularly relates to a wire tube structure that is configured to locate fiber material at optimum locations within an exhaust component.

BACKGROUND OF THE INVENTION

Exhaust systems are widely known and used with combustion engines. Typically, an exhaust system includes exhaust tubes that convey hot exhaust gases from the engine to other exhaust system components, such as mufflers, resonators, etc. Mufflers and resonators include acoustic chambers that cancel out sound waves carried by the exhaust gases. Each component includes at least one inlet pipe and at least one outlet pipe, and can include one or more internal tubes or pipes within the component to direct exhaust gas flow from the inlet pipe to the outlet pipe.

These exhaust components often include fiber material, such as Basalt or Fiberglass materials for example, that act to further reduce noise generation. One common problem with exhaust system components, such as a muffler for example, is that the fiber material must fill an entire muffler inner cavity in order to be located around the internal pipes. This is disadvantageous from a weight and cost perspective.

SUMMARY OF THE INVENTION

A vehicle exhaust component includes an internal pipe surrounded by a tube structure. The tube structure is radially spaced from the internal pipe by a gap to define an optimum location for fiber material. The gap is substantially filled with the fiber material to provide a reduced noise configuration without requiring the entire internal cavity to be filled with fiber material.

In one example, the tube structure is comprises a wire tube. The wire tube is made of a wire mesh or knitted wire material. The wire tube surrounds a substantial length of the internal pipe. Thus, the fiber material, which is located in the gap to directly surround a substantial length of the internal pipe, is positioned at an optimum location without adversely affecting weight and cost.

These and other features of the present invention can be best understood from the following specification and drawings, the following of which is a brief description.

DETAILED DESCRIPTION OF THE PREFERRED EMBODIMENT

Figure 1:
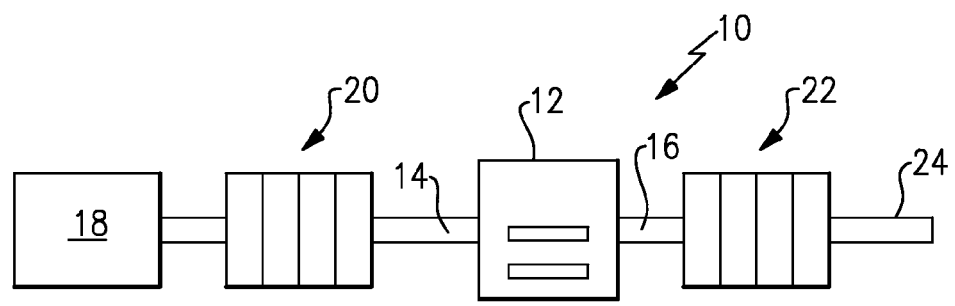
FIG. 1 shows a schematic view of an exhaust system.

As shown in FIG. 1, an exhaust system 10 includes an exhaust component 12 having an exhaust gas inlet pipe 14 and an exhaust gas outlet pipe 16. Exhaust gases generated by an engine 18 are communicated through the exhaust component 12 from the exhaust gas inlet pipe 14 to the exhaust gas outlet pipe 16. One or more exhaust components, generally referred to at 20 can be positioned between the exhaust component 12 and the engine 18. Further, additional exhaust components 22 may be located downstream of the exhaust component 12. Exhaust gases exit the exhaust system 10 through at least one tailpipe 24.

Figure 2:
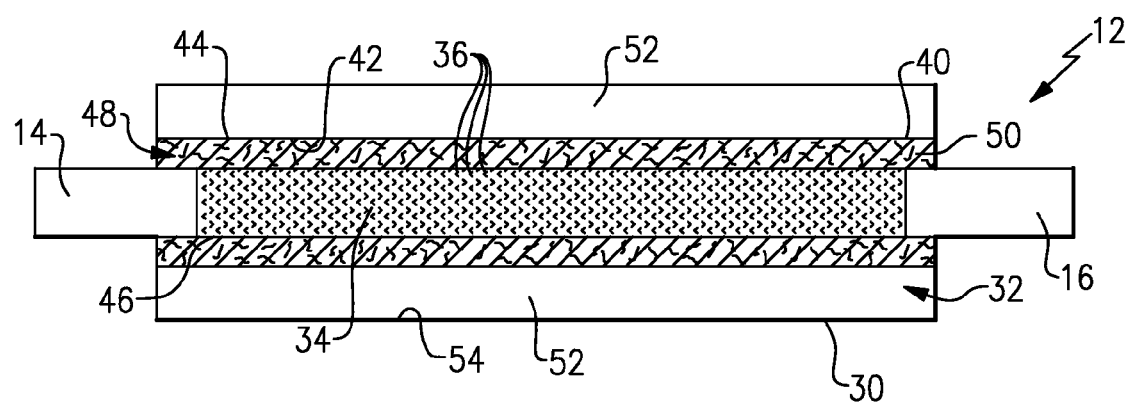
FIG. 2 is a schematic view that shows one example of an internal pipe and wire tube structure configuration.

In one example, the exhaust component 12 comprises a muffler. As shown in FIG. 2, the exhaust component 12 includes an outer shell 30 defining an internal cavity 32. At least one internal pipe 34 is positioned within the internal cavity 32. This internal pipe 34 can be positioned anywhere within the internal cavity 32. In the example shown, the internal pipe 34 includes perforations 36; however, the internal pipe could also comprise a non-perforated pipe.

In one example configuration, the internal pipe 34 extends from the inlet pipe 14 to the outlet pipe 16. Optionally, the internal pipe 34 could be supported within the internal cavity 32 by baffles or other types of internal support structures. Further, while one internal pipe 34 is shown, it should be understood that multiple internal pipes 34 could be positioned within the internal cavity 32.

A wire tube 40 is positioned to surround the internal pipe 34. The wire tube 40 surrounds a substantial length of the internal pipe 34, and can even extend beyond the ends of the internal pipe 34 to overlap connection joints to other pipes, such as the inlet pipe 14 and the outlet pipe 16 for example. In one example, the wire tube 40 comprises a wire mesh or knitted metal material, which can be comprised of a stainless steel or non-corrosive type of material.

The wire tube 40 has an inner peripheral surface 42 and an outer peripheral surface 44. The inner peripheral surface 42 of the wire tube 40 is radially spaced from an outer surface 46 of the internal pipe 34 by a radial gap 48.

Fiber material 50, such as Basalt or Fiberglass material, for example, substantially fills the radial gap 48 to provide a reduced noise configuration. This leaves a remaining open space 52 around the wire tube 40 between an inner surface 54 of the outer shell 30 and the outer peripheral surface 44 of the wire tube 40. Thus, the wire tube 40 serves to locate the fiber material 50 at the optimum location, i.e. directly surrounding the internal pipe 34, without requiring the entire internal cavity 32 to be filled with fiber material. This provides a significant cost and weight savings.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:
1. A vehicle exhaust component comprising:
   an outer shell defining an internal cavity;
   at least one pipe located within said internal cavity;
   at least one wire tube surrounding said at least one pipe, said at least one wire tube having an inner peripheral surface that is radially spaced apart from an outer peripheral surface of said at least one pipe by a radial gap; and
   fiber material substantially filling said radial gap.
2. The vehicle exhaust component according to claim 1 wherein said at least one wire tube comprises a wire mesh material.
3. The vehicle exhaust component according to claim 2 wherein said wire mesh material comprises a stainless steel material.
4. The vehicle exhaust component according to claim 1 wherein said at least one wire tube surrounds a substantial length of said at least one pipe.
5. The vehicle exhaust component according to claim 1 wherein said outer shell includes an inner shell surface and wherein said internal cavity includes an air gap between said inner shell surface and an outer surface of said at least one tube.

6. A vehicle exhaust component comprising:
an outer shell defining an internal cavity;
at least one inlet pipe supported by said outer shell;
at least one outlet pipe supported by said outer shell;
at least one internal pipe located within said internal cavity to direct exhaust gas from said at least one inlet pipe, through said internal cavity, and to said at least one outlet pipe;
at least one wire tube surrounding said at least one internal pipe, said at least one wire tube having an inner peripheral surface that is radially spaced apart from an outer peripheral surface of said at least one internal pipe by a radial gap; and
fiber material located radially between said at least one wire tube and said at least one internal pipe to substantially fill said radial gap.

7. The vehicle exhaust component according to claim 6 wherein said fiber material in said outer shell is only located between an inner peripheral surface of said at least one wire tube and an outer peripheral surface of said at least one internal pipe.

8. The vehicle exhaust component according to claim 6 wherein said at least one wire tube is comprised of a stainless steel mesh.

9. A method of assembling a vehicle exhaust component comprising the steps of:
(a) positioning at least one internal pipe within an internal cavity of an exhaust component;
(b) surrounding the at least one internal pipe with a wire tube; and
(c) filling a radial space between the wire tube and the at least one internal pipe with a fiber material.

10. The method according to claim 9 including positioning the wire tube to surround a substantial length of the at least one internal pipe.

11. The method according to claim 10 including forming the wire tube from a wire mesh material.

12. The method according to claim 10 including leaving all area between an outer surface of the wire tube and an inner surface of the exhaust component as open free space.

13. The method according to claim 10 wherein the wire tube comprises the only tube surrounding the internal pipe.

14. The method according to claim 10 wherein the fiber material located within the radial gap comprises the only fiber material positioned within the exhaust component.

15. The method according to claim 10 wherein the internal pipe has a first end coupled to an inlet pipe and a second end coupled to an outlet pipe, and including extending the wire tube beyond at least one of the first and second ends to overlap at least one of the inlet and outlet pipe.

16. The vehicle exhaust component according to claim 1 wherein said wire tube has a first end coupled to an inlet pipe and a second end coupled to an outlet pipe, and wherein said wire tube completely surrounds an entire length of said internal tube and extends axially beyond at least one of said first and second ends to overlap at least one of said inlet and outlet pipes.

17. The vehicle exhaust component according to claim 1 wherein said wire tube comprises the only tube surrounding said internal pipe.

18. The vehicle exhaust component according to claim 1 wherein said fiber material located within said radial gap comprises the only fiber material positioned within the vehicle exhaust component.

19. The vehicle exhaust component according to claim 6 wherein said wire tube has a first end coupled to said inlet pipe and a second end coupled to said outlet pipe, and wherein said wire tube completely surrounds an entire length of said internal tube and extends axially beyond said first and second ends to at least partially overlap said inlet and outlet pipes.

20. The vehicle exhaust component according to claim 1 wherein said wire tube comprises the only tube surrounding said internal pipe, and wherein said fiber material located within said radial gap comprises the only fiber material positioned within the vehicle exhaust component.

* * * * *